United States Patent
Moriguchi et al.

(10) Patent No.: US 11,438,397 B2
(45) Date of Patent: Sep. 6, 2022

(54) BROADCAST SYSTEM, TERMINAL APPARATUS, METHOD FOR OPERATING TERMINAL APPARATUS, AND RECORDING MEDIUM

(71) Applicant: YAMAHA CORPORATION, Hamamatsu (JP)

(72) Inventors: Shota Moriguchi, Tokyo (JP); Yuki Seto, Moriya (JP)

(73) Assignee: YAMAHA CORPORATION, Hamamatsu (JP)

( * ) Notice: Subject to any disclaimer, the term of this patent is extended or adjusted under 35 U.S.C. 154(b) by 0 days.

(21) Appl. No.: 17/136,490

(22) Filed: Dec. 29, 2020

(65) Prior Publication Data

US 2021/0120055 A1    Apr. 22, 2021

Related U.S. Application Data

(63) Continuation of application No. PCT/JP2019/025939, filed on Jun. 28, 2019.

(30) Foreign Application Priority Data

Jul. 2, 2018  (JP) .............................. JP2018-126053

(51) Int. Cl.
  *H04L 65/611*   (2022.01)
  *G06F 40/20*    (2020.01)
  (Continued)

(52) U.S. Cl.
  CPC ............ *H04L 65/611* (2022.05); *G06F 40/20* (2020.01); *G10L 17/02* (2013.01); *H04L 12/18* (2013.01)

(58) Field of Classification Search
  CPC ........ H04H 60/00; H04H 60/02; H04H 20/10; H04H 20/103; H04H 20/106; H04H 20/59;
  (Continued)

(56) References Cited

U.S. PATENT DOCUMENTS 5,907,793 A * 5/1999 Reams .................... H04N 7/173
                                                    725/122
5,917,887 A * 6/1999 Fesler ................... G08B 25/016
                                                    379/48

(Continued)

FOREIGN PATENT DOCUMENTS

JP    2009038774 A    2/2009
JP    2013247615 A    12/2013
       (Continued)

OTHER PUBLICATIONS

English translation of Written Opinion issued in Intl. Appln. No. PCT/JP2019/025939 dated Sep. 10, 2019, previously cited in IDS filed Dec. 29, 2020.

(Continued)

*Primary Examiner* — Mohamed A. Wasel
*Assistant Examiner* — Rachel J Hackenberg
(74) *Attorney, Agent, or Firm* — Rossi, Kimms & McDowell LLP

(57) ABSTRACT

A broadcast system acquires a first audio signal and a second audio signal, and switch from one of broadcast operations by a broadcast device to another thereof, the broadcast operations including a first broadcast operation that transmits the first audio signal and the second broadcast operation that transmits a second audio signal. The first audio signal includes: a first voice; and a first sound component representative of first identification information corresponding to first related information related to the first voice, the first (Continued)

related information being provided from a distribution apparatus via a communication network to a terminal apparatus, and the second audio signal includes: a second voice; and a second sound component representative of second identification information corresponding to second related information related to the second voice, the second related information being registered in advance in the terminal apparatus.

8 Claims, 6 Drawing Sheets

(51) Int. Cl.
*G10L 17/02* (2013.01)
*H04L 12/18* (2006.01)

(58) Field of Classification Search
CPC ..... H04L 65/4076; H04L 12/18; G06F 40/20; G10L 17/02
See application file for complete search history.

(56) References Cited

U.S. PATENT DOCUMENTS

| | | | | |
|---|---|---|---|---|
| 5,995,553 A * | 11/1999 | Crandall | ............. | G08B 25/085 375/272 |
| 6,510,207 B1 * | 1/2003 | Cannon | ............... | H04M 1/6505 379/37 |
| 6,553,215 B1 * | 4/2003 | Chung | ................... | H04B 1/005 455/161.1 |
| 8,520,821 B2 * | 8/2013 | Alexandrov | ........ | H04L 65/4053 379/202.01 |
| 10,129,594 B2 * | 11/2018 | David | ................ | H04N 21/4622 |
| 2004/0137929 A1 | 7/2004 | Jones | | |
| 2005/0031095 A1 * | 2/2005 | Pietrowicz | ............ | H04M 3/465 379/88.18 |
| 2011/0191801 A1 * | 8/2011 | Vytheeswaran | .......... | H04N 7/10 725/34 |
| 2013/0247094 A1 * | 9/2013 | Hardin | ................. | H04N 21/814 725/33 |
| 2017/0213552 A1 * | 7/2017 | Gupta | ..................... | G10L 15/26 |

FOREIGN PATENT DOCUMENTS

| | | |
|---|---|---|
| WO | 0245273 A2 | 6/2002 |
| WO | 2013086122 A1 | 6/2013 |
| WO | 2013118711 A1 | 8/2013 |

OTHER PUBLICATIONS

International Search Report issued in Intl. Appln. No PCT/JP2019/025939 dated Sep. 10, 2019 English translation provided.

Written Opinion issued in Intl. Appln. No. PCT/JP2019/025939 dated Sep. 10, 2019.

Extended European Search Report issued in European Appln. No. 19831358.7 mailed Feb. 25, 2022.

* cited by examiner

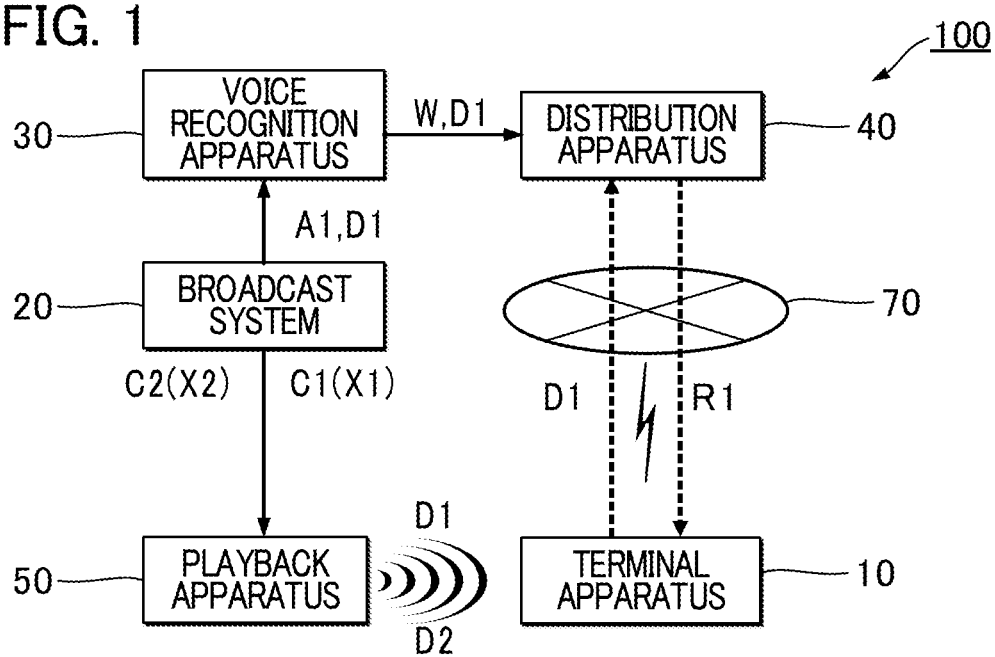
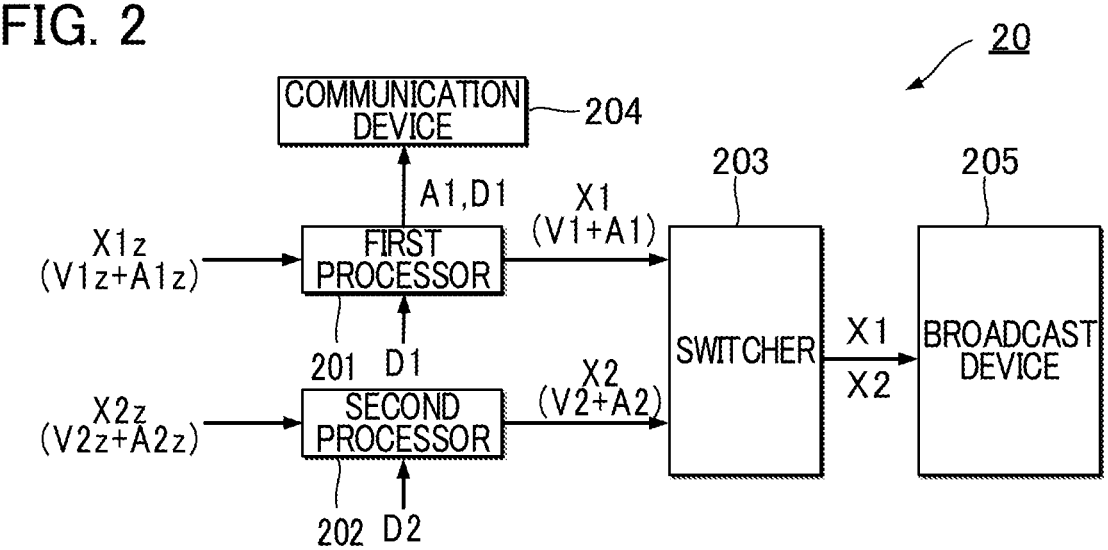

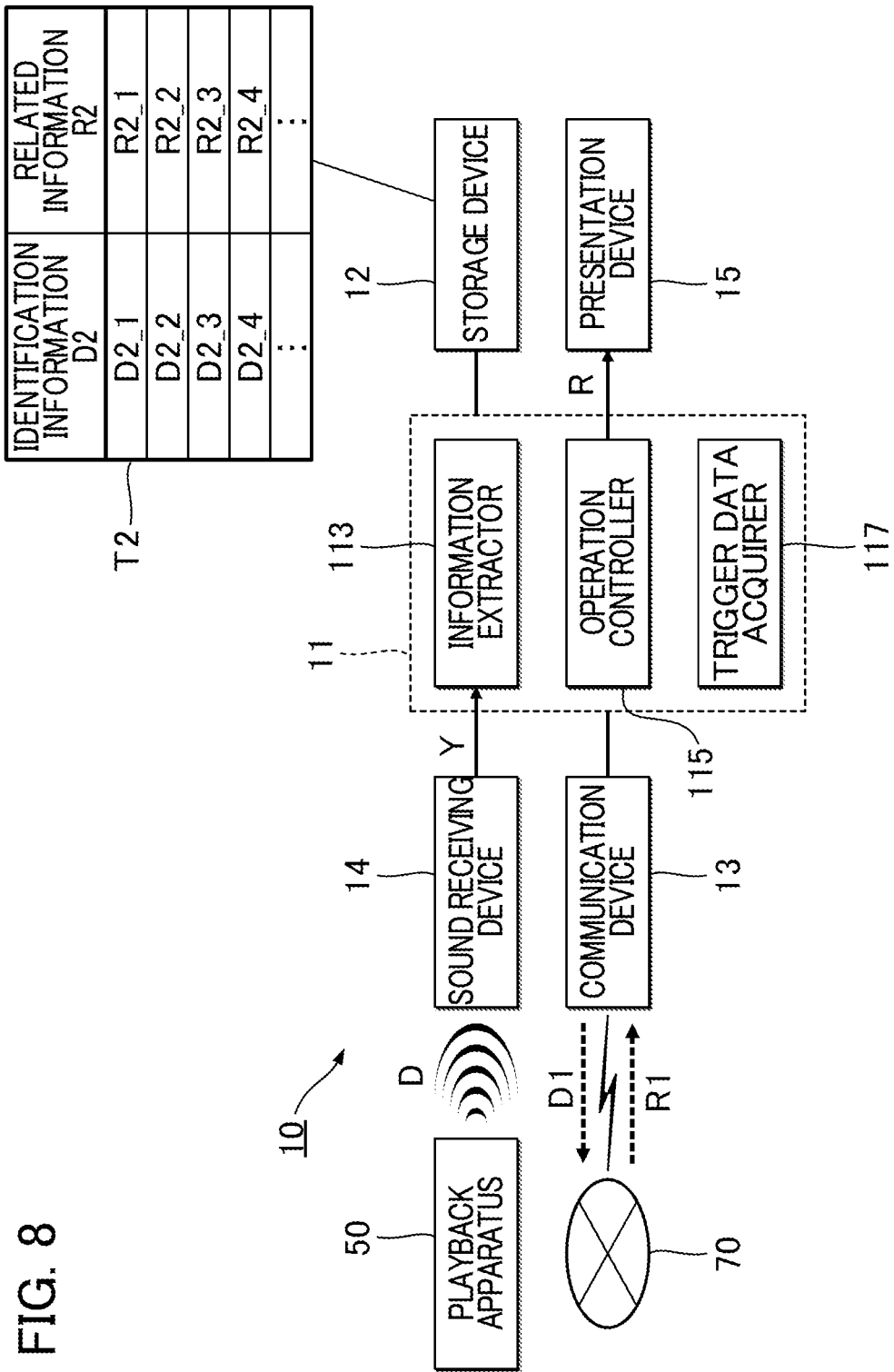

BROADCAST SYSTEM, TERMINAL APPARATUS, METHOD FOR OPERATING TERMINAL APPARATUS, AND RECORDING MEDIUM

CROSS REFERENCE TO RELATED APPLICATIONS

This application is a Continuation Application of PCT Application No. PCT/JP2019/025939, filed Jun. 28, 2019, and is based on and claims priority from Japanese Patent Application No. 2018-126053, filed Jul. 2, 2018, the entire contents of each of which are incorporated herein by reference.

BACKGROUND

Technical Field

The present disclosure relates to a technique for broadcasting various types of information.

Background Information

Conventionally, a technique is proposed for providing to a terminal apparatus information related to broadcast content. For example, Japanese Patent Application Laid-Open Publication No. 2009-38774 (hereafter, "Patent Document 1") discloses a configuration to transmit, through a broadcasting and communication network, text data that corresponds to digital broadcast. A digital broadcast reception device upon receipt of the digital broadcast transmits the text data to a terminal apparatus by way of near field communication, such as Bluetooth (registered trademark).

The technique disclosed in Patent Document 1 requires a communication device for near field communication to acquire the text data.

SUMMARY

The present disclosure has been made in view of the above circumstances, and has as an object provision of a wide variety of information to a user of a terminal apparatus without need for a communication device for near field communication.

In one aspect, a broadcast system has at least one processor that implements instructions stored in a memory to: acquire a first audio signal and a second audio signal, and switch from one of a plurality of broadcast operations by a broadcast device to another thereof, the plurality of broadcast operations including a first broadcast operation that transmits the first audio signal and the second broadcast operation that transmits a second audio signal. The first audio signal includes: a first voice; and a first sound component representative of first identification information corresponding to first related information related to the first voice, the first related information being provided from a distribution apparatus via a communication network to a terminal apparatus, and the second audio signal includes: a second voice; and a second sound component representative of second identification information corresponding to second related information related to the second voice, the second related information being registered in advance in the terminal apparatus.

In another aspect, a terminal apparatus has at least one processor that implements instructions stored in a memory to: extract identification information from an audio signal, which is generated by a sound receiving device upon receiving a playback sound played by a playback apparatus; determine whether trigger data is included in the audio signal; and switch, based on the trigger data being included in the audio signal, to one of: a first acquiring operation that acquires first related information corresponding to the identification information by transmitting via a communication network the identification information to a distribution apparatus; or a second acquiring operation that acquires second related information corresponding to the identification information from a storage device of the terminal apparatus; and perform the switched one of the first acquiring operation or the second acquiring operation.

In still another aspect, a method of operating a terminal apparatus includes: extracting identification information from an audio signal, which is generated by a sound receiving device upon receiving a playback sound played by a playback apparatus; determining whether trigger data is included in the audio signal; switching, based on the trigger data being included in the audio signal, to one of: a first acquiring operation that acquires first related information corresponding to the identification information by transmitting the identification information to a distribution apparatus via a communication network; or a second acquiring operation that acquires second related information corresponding to the identification information from a storage device in the terminal apparatus; and performing the switched one of the first acquiring operation or the second acquiring operation.

In still yet another aspect, a non-transitory computer-readable recording medium stores a program executable by a computer to execute a method of operating a terminal apparatus, the method comprising: extracting identification information from an audio signal, which is generated by a sound receiving device upon receiving a playback sound played by a playback apparatus; determining whether trigger data is included in the audio signal; switching, based on the trigger data being included in the audio signal, to one of: a first acquiring operation that acquires first related information corresponding to the identification information by transmitting the identification information to a distribution apparatus via a communication network; or a second acquiring operation that acquires second related information corresponding to the identification information from a storage device in the terminal apparatus; and performing the switched one of the first acquiring operation or the second information.

BRIEF DESCRIPTION OF THE DRAWINGS

FIG. 1 is a block diagram illustrating an example of a configuration of an information providing system according to a first embodiment.

FIG. 2 is a block diagram illustrating an example of a configuration of a broadcast system.

FIG. 8 is a block diagram illustrating an example of a configuration of a terminal apparatus according to a third embodiment.

DETAILED DESCRIPTION

First Embodiment

Figure 3:
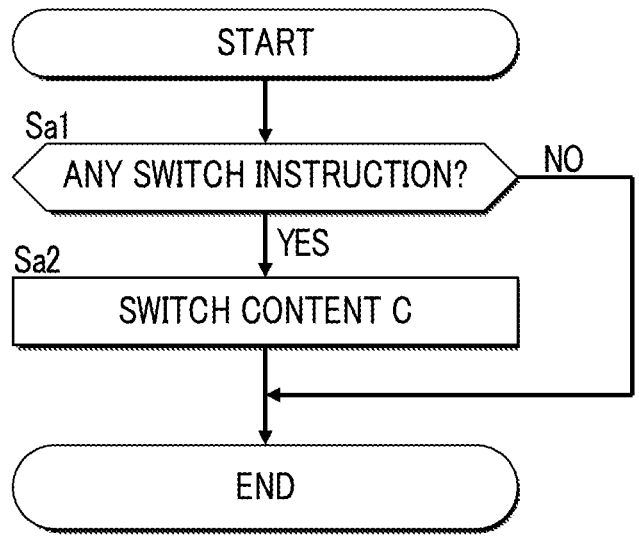
FIG. 3 is a flowchart illustrating an example of processing performed by the broadcast system.

FIG. 1 is a block diagram illustrating an example of a configuration of an information providing system 100 according to a first embodiment of the present disclosure. The information providing system 100 is a computer system that provides various types of information to viewers who watch and listen to a content C provided through broadcasting. For example, a television program provided by terrestrial broadcasting or satellite broadcasting, each of which utilizes broadcast waves, is illustrated as an example of the content C constituted of both images and sound.

As illustrated in FIG. 1, the information providing system 100 according to the first embodiment includes a terminal apparatus 10, a broadcast system 20, a voice recognition apparatus 30, a distribution apparatus 40, and a playback apparatus 50. The terminal apparatus 10 and the distribution apparatus 40 are capable of communicating with each other via a communication network 70, such as, for example, a mobile communication network and/or the Internet. Information R related to the content C broadcast from the broadcast system 20 (hereafter, "related information") is provided to the terminal apparatus 10 for use by a viewer who watches and listens to the content C using the playback apparatus 50. The terminal apparatus 10 is a portable information terminal such as a mobile phone, a smartphone, a tablet terminal, or a personal computer.

Broadcast System 20

FIG. 2 is a block diagram illustrative of an example of a configuration of the broadcast system 20 according to the first embodiment. The broadcast system 20 is a computer system for broadcast of the content C. Specifically, the broadcast system 20 transmits data X that represents the content C (hereafter, "broadcast data"). In the first embodiment, the broadcast data X is transmitted via broadcast waves. The broadcast data X includes an image signal V that represents images of the content C, and an audio signal A that represents sound of the content C.

The broadcast system 20 according to the first embodiment broadcasts a first content C1 and a second content C2. The first content C1 is, for example, a television program with low emergency content. Examples of the content C1 include regularly broadcast television programs, such as dramas, movies, variety shows, and sports programs. In contrast, the second content C2 is, for example, a television program with high emergency content. Specifically, the second content C2 is a television program that includes emergency news that provides information about an emergency (a disaster such as an earthquake, fire, and others). The second content C2 may also be a television program that includes weather forecasts. Namely, the second content C2 may be predictable, fixed-phrase content (i.e., content that can be preset).

For broadcast of the first content C1, related information R1 related to a voice of the first content C1 (hereafter, a "first voice") is provided to the terminal apparatus 10. For broadcast of the second content C2, related information R2 related to a voice of the second content C2 (hereafter, "second voice") is provided to the terminal apparatus 10. The related information R1 (an example of first related information) is acquired from the distribution apparatus 40 via the communication network 70. In contrast, the related information R2 (an example of second related information) is acquired from a storage device of the terminal apparatus 10. That is, the related information R2 is acquired without need for communication via the communication network 70. The related information R2 is registered in advance in the storage device of the terminal apparatus 10.

As illustrated in FIG. 2, the broadcast system 20 includes a first processor 201, a second processor 202, a switcher 203, a communication device 204, and a broadcast device 205 (an example of broadcaster). The functions of the first processor 201, the second processor 202, and the switcher 203 are realized by executing programs by one or more processors, such as a CPU (Central Processing Unit).

The first processor 201 generates broadcast data X1 of the first content C1. The broadcast data X1 includes an image signal V1 and an audio signal A1. Specifically, the first processor 201 generates the broadcast data X1 by performing edit processing on broadcast data X1$z$. For example, the broadcast data X1$z$ is recorded using a recording device at a designated studio. The recording device includes an image capture device configured to generate an image signal V1$z$ by capturing an image of a subject, and a sound receiving device configured to generate an audio signal A1$z$ based on received sound. A first voice is contained in the sound represented by the audio signal A1$z$. The first voice is, for example, a voice spoken by a cast member of the first content C1. As will be understood from the above descriptions, the broadcast data X1$z$ is constituted of the image signal V1$z$ and the audio signal A1$z$.

The edit processing performed by the first processor 201 includes audio processing to generate the audio signal A1 from the audio signal A1$z$, and image processing to generate the image signal V1 from the image signal V1$z$. The image processing includes various kinds of processes to adjust the characteristics of the image represented by the image signal V1$z$. The audio processing includes various kinds of processes to adjust the frequency characteristics of the audio signal A1$z$. The audio processing in the first embodiment includes a process of adding identification information D1 to the audio signal A1$z$ (hereafter, "first process"). The identification information D1 is repeatedly added to the audio signal A1$z$ at a predetermined cycle. The identification information D1 (an example of first identification information) is information that identifies the related information R1. The identification information D1 according to the first embodiment is indicative of a broadcast station that broadcasts the first content C1 (that is, a program including a first voice).

The first process is signal processing to generate the audio signal A1 by adding together the audio signal A1$z$ and a modulated signal. The modulated signal represents the identification information D1 in the form of a sound component. That is, the audio signal A1 contains the first voice and a sound component that represents the identification information D1. A modulated signal is generated by, for example, frequency-modulating a carrier wave at a certain frequency with the identification information D1. A modulated signal may be generated by sequentially performing spread modulation on the identification information D1 by use of a spreading code, and by performing frequency conversion by use of a predetermined-frequency carrier. The frequency band of a modulated signal is set to a frequency band within which the playback apparatus 50 can output a sound and the terminal apparatus 10 can receive a sound, while being set higher than the frequency band of a voice to be heard by a user of the terminal apparatus 10 in a normal environment (for example, 18 kHz or higher and 20 kHz or lower). Therefore, a sound component of the identification information D1 is scarcely audible to the user of the terminal apparatus 10. The frequency band of a modulated signal can be set to any frequency band. For example, a modulated signal can be modulated to fall within an audible frequency band. The broadcast data X1 including the image signal V1 and the audio signal A1 is generated by the edit processing described above.

The second processor 202 generates broadcast data X2 of the second content C2. The broadcast data X2 includes an image signal V2 and an audio signal A2. Specifically, the second processor 202 generates the broadcast data X2 by performing edit processing on broadcast data X2$z$. For example, the broadcast data X2$z$ is recorded by a recording device in a designated studio in substantially the same manner as the broadcast data X1$z$. Specifically, the broadcast data X2$z$ is constituted of an image signal V2$z$ and an audio signal A2$z$. A second voice is contained in the sound represented by the audio signal A2$z$. The second voice is, for example, a voice spoken by a cast member of the second content C2. In the first embodiment, the second voice may be a voice that conveys information about an emergency.

The edit processing performed by the second processor 202 includes audio processing to generate the audio signal A2 from the audio signal A2$z$, and image processing to generate the image signal V2 from the image signal V2$z$. The image processing includes various kinds of processes to adjust the characteristics of the image represented by the image signal V2$z$. The audio processing includes various kinds of processes to adjust the frequency characteristics of the audio signal A2$z$. The audio processing in the first embodiment includes a process of adding identification information D2 to the audio signal A2$z$ (hereafter, "second process"). The identification information D2 is repeatedly added to the audio signal A2$z$ at a predetermined cycle. The identification information D2 (an example of second identification information) is information that identifies the related information R2.

The second process is signal processing that generates the audio signal A2 by adding together the audio signal A2$z$ and a modulated signal. The modulated signal represents the identification information D2 in the form of a sound component. That is, the audio signal A2 contains the second voice and a sound component that represents the identification information D2. In the second process also, a modulated signal is generated by, for example, frequency-modulating a carrier wave at a predetermined frequency with the identification information D2 in substantially the same manner as in the first process. Identification information D (D1 and D2) may be prepared in advance, or may be generated each time the identification information D is added to the audio signal A. The broadcast data X2 including the image signal V2 and the audio signal A2 is generated by the edit processing described above.

The broadcast device 205 is configured to broadcast various kinds of content C. For example, the broadcast device 205 is constituted of a transmitter configured to transmit the broadcast data X to a radio tower that transmits the broadcast data X via broadcast waves. The broadcast data X representative of the content C is transmitted from the broadcast device 205 to the playback apparatus 50. The broadcast device 205 according to the first embodiment selectively performs either an operation to broadcast the first content C1 including the audio signal A1 (hereafter, "first broadcast operation") or an operation to broadcast the second content C2 including the audio signal A2 (hereafter, "second broadcast operation"). In the first broadcast operation, the broadcast data X1, which represents the first content C1, is transmitted from the broadcast device 205. In the second broadcast operation, the broadcast data X2, which represents the second content C2, is transmitted from the broadcast device 205.

It is possible for an administrator of the broadcast system 20 to provide the broadcast system 20 with an instruction to switch one of the first broadcast operation and the second broadcast operation to the other (hereafter, a "switch instruction") by, for example, operating an input device. When the switcher 203 receives a switch instruction, the switcher 203 switches one of the first broadcast operation and the second broadcast operation to the other in accordance with the switch instruction. For example, in accordance with the switch instruction, the switcher 203 acquires the broadcast data X from one of the first processor 201 or the second processor 202, and outputs the acquired broadcast data X to the broadcast device 205. That is, the first content C1 or the second content C2 is selectively broadcast. The switcher 203 is an example of an acquirer configured to acquire the audio signal A1 and the audio signal A2.

The communication device 204 is configured to communicate with the voice recognition apparatus 30 by wire or wirelessly. Specifically, the communication device 204 transmits to the voice recognition apparatus 30 the audio signal A1 of the first content C1 and the identification information D1 corresponding to the audio signal A1. The communication device 204 may transmit a signal (the audio signal A1$z$) that differs from the audio signal A1 to the voice recognition apparatus 30 if it is possible for the voice recognition apparatus 30 to recognize a voice represented by the signal.

FIG. 3 is a flowchart illustrating an example of processing performed by the broadcast system 20. For example, when the broadcast of the content C by the broadcast system 20 is initiated, the processing in FIG. 3 is initiated. The switcher 203 in the broadcast system 20 determines whether a switch instruction is supplied (Sa1). Upon supply of a switch instruction (YES at Sa1), the switcher 203 switches the content C in accordance with the switch instruction (Sa2).

Voice Recognition Apparatus 30

The voice recognition apparatus 30 in FIG. 1 performs voice recognition on the audio signal A1 transmitted from the broadcast system 20. Since a first voice is included in the audio signal A1, text that represents a spoken content of the first voice can be identified. Any publicly known technique can be employed for voice recognition of the audio signal A1, such as recognition processing using an audio model, for example, an HMM (Hidden Markov Model) and a language model that indicates language constraints. A result W of the voice recognition of the audio signal A1 (hereafter, "recognition result"), and identification information D1 that corresponds to the audio signal A1 (i.e., the identification information D1 transmitted together with the audio signal A1 from the broadcast system 20) are transmitted to the distribution apparatus 40. In the first embodiment, concurrently with the broadcast of the first content C1, voice recognition is performed on the audio signal A1 of the first content C1.

Distribution Apparatus 40

Figure 4:
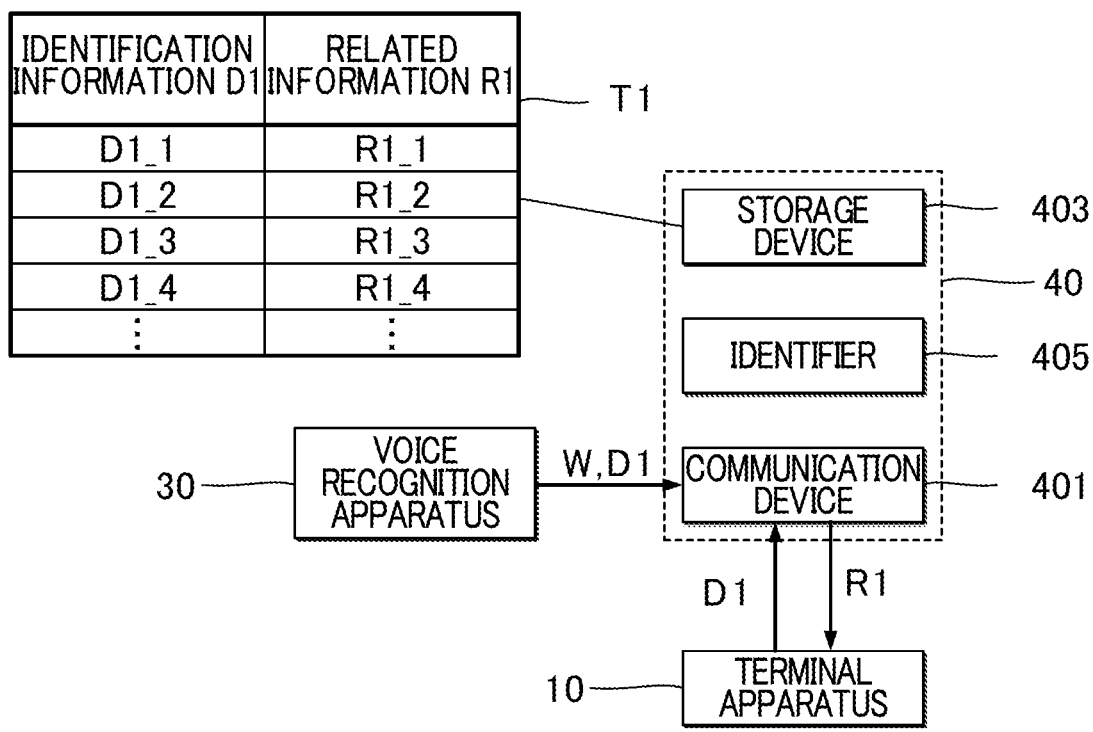
FIG. 4 is a block diagram illustrating an example of a configuration of a distribution apparatus.

FIG. 4 is a block diagram illustrating an example of a configuration of the distribution apparatus 40. As illustrated in FIG. 4, the distribution apparatus 40 according to the first embodiment includes a communication device 401, a storage device 403, and an identifier 405. The communication device 401 communicates individually with the voice recognition apparatus 30 and the terminal apparatus 10. The voice recognition apparatus 30 and the distribution apparatus 40 communicate with each other, for example, by wire or wirelessly. The communication device 401 according to the first embodiment receives the identification information D1 and the recognition result W transmitted from the voice recognition apparatus 30. The communication device 401 receives from the terminal apparatus 10 via the communication network 70 a request for the related information R1. The identification information D1 is included in the request from the terminal apparatus 10.

The storage device 403 stores various types of data for providing the related information R1 to the terminal apparatus 10. Any publicly known recording medium, for example, a semiconductor recording medium and a magnetic recording medium, or any combination of different types of recording media can be employed as the storage device 403. The storage device 403 according to the first embodiment stores a first table T1. The first table T1 is a data table in which the identification information D1 and the related information R1 are registered in association with each other. In the first embodiment, the related information R1 may be the recognition result W of the audio signal A1. Specifically, the recognition result W and the identification information D1 transmitted from the voice recognition apparatus 30 are associated with each other and registered in the first table T1. That is, in the first table T1, a broadcast station that broadcasts the first content C1 and text (that is, subtitles) of a first voice included in the first content C1 are associated with each other. Since the audio signal A1 is transmitted to the voice recognition apparatus 30 from each of broadcast stations, in actuality, the related information R1 can be registered in association with each of the broadcast stations in the first table T1.

The identifier 405 identifies the related information R1 in response to a request from the terminal apparatus 10. The first table T1 is used to identify the related information R1. Specifically, the identifier 405 identifies related information R1 that corresponds to the identification information D1 transmitted from the terminal apparatus 10, from among a plurality of pieces of the identification information D1 registered in the first table T1. The function of the identifier 405 is realized by executing a program by one or more processors, such as a CPU (Central Processing Unit). The communication device 401 transmits the related information R1 identified by the identifier 405 to the terminal apparatus 10.

Playback Apparatus 50

The playback apparatus 50 plays the content C represented by the broadcast data X transmitted from the broadcast system 20. A typical example of the playback apparatus 50 is a television receiver. The playback apparatus 50 according to the first embodiment plays the first content C1 upon receiving the broadcast data X1, and plays the second content C2 upon receiving the broadcast data X2. Specifically, the playback apparatus 50 includes a receiver configured to receive the broadcast data X, a display device configured to display various types of image (for example, a liquid crystal panel), and a sound output device configured to output various types of sound (for example, a speaker).

The display device displays images in accordance with the image signal V included in the broadcast data X received by the receiver. The sound output device outputs sound in accordance with the audio signal A included in the broadcast data X received by the receiver. When the broadcast data X1 is received, a first voice and sound that represents the identification information D1 are output. When the broadcast data X2 is received, a second voice and sound that represents the identification information D2 are output. The sound output device according to the first embodiment not only serves as an audio device that plays a voice of the content C, but also serves as a transmitter that transmits to a surrounding the identification information D (D1 and D2) via sound communication by way of sound waves, i.e., vibration of air, that act as a transmission medium. That is, in the first embodiment, the identification information D is transmitted to the surrounding via sound communication from the sound output device, which is configured to output a voice of the content. The identification information D is transmitted repeatedly at a predetermined cycle concurrently with the output of a voice.

Terminal Apparatus 10

Figure 5:
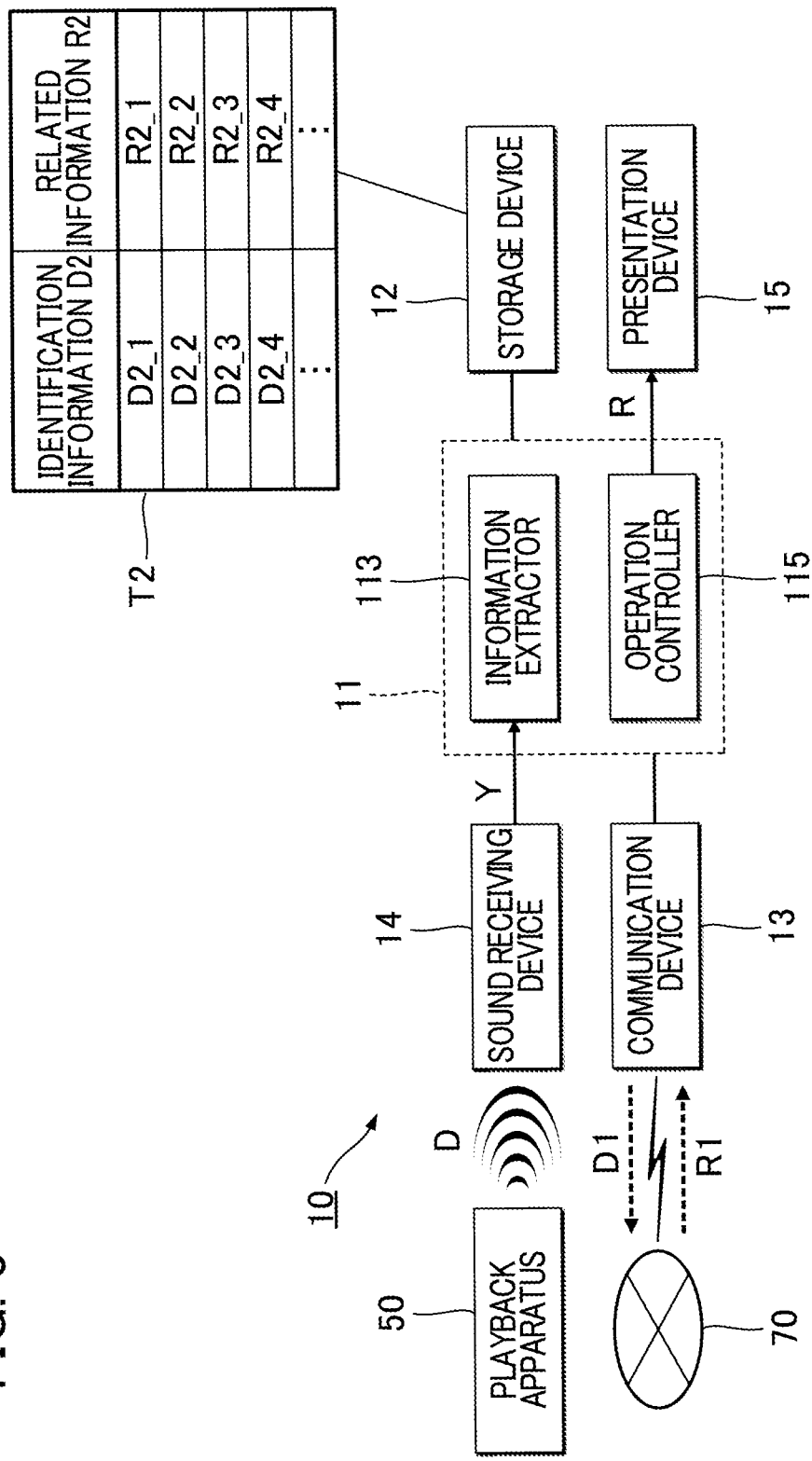
FIG. 5 is a block diagram illustrating an example of a configuration of a terminal apparatus.

FIG. 5 is a block diagram illustrating an example of a configuration of the terminal apparatus 10. As illustrated in FIG. 5, the terminal apparatus 10 includes a controller 11, a storage device 12, a communication device 13, a sound receiving device 14, and a presentation device 15. The sound receiving device 14 is an audio device configured to receive sound in the surrounding (a microphone). Specifically, the sound receiving device 14 receives sound output by the playback apparatus 50, and generates an audio signal Y that represents a waveform of the sound. When the first content C1 is played by the playback apparatus 50, the identification information D1 is included in the audio signal Y. When the second content C2 is played by the playback apparatus 50, the identification information D2 is included in the audio signal Y.

As will be understood from the above descriptions, the sound receiving device 14 is not only used for a voice call or voice recording during video capture, but also acts as a receiver configured to receive the identification information D (D1 and D2) via sound communication by way of sound waves, i.e., vibration of air, that act as a transmission medium. Illustrations of an A/D converter configured to convert the audio signal Y generated by the sound receiving device 14 from analog to digital form are omitted for the sake of convenience. Instead of the sound receiving device 14 integrated with the terminal apparatus 10, a separate sound receiving device 14 may be connected to the terminal apparatus 10 either by wire or wirelessly.

The communication device 13 communicates with the distribution apparatus 40 via the communication network 70 under control of the controller 11. The communication device 13 according to the first embodiment transmits a request for the related information R1 to the distribution apparatus 40, and receives the related information R1 from the distribution apparatus 40.

The controller 11 (an example of a computer) is constituted of one or more processors, such as a CPU (Central Processing Unit). The controller 11 integrally controls each element of the terminal apparatus 10. The storage device 12 stores programs to be executed by the controller 11 and various types of data to be used by the controller 11. Any publicly known recording medium, for example, a semiconductor recording medium or a magnetic recording medium, or any combination of multiple types of recording media can be employed as the storage device 12.

The storage device 12 according to the first embodiment stores a second table T2. The second table T2 is a data table in which the identification information D2 and the related information R2 are registered in association with each other. The identification information D2 and the related information R2 are registered in advance in the second table T2. For example, the second table T2 is acquired in advance from a webserver. As described above, the related information R2 relates to a second voice. Since the second content C2 is, for example, a television program to convey information about an emergency, the spoken content of the second voice can be predicted in advance. For example, the second content C2 can include a spoken content of a second voice that announces occurrence of an earthquake, such as "an earthquake has occurred." In a case where the second content C2 is a television program about a weather forecast, the second voice may be a spoken content that represents weather conditions, "it will be fine tomorrow" or "it will start raining from the evening." Since the second content C2 can be in the form of fixed phrases, it is possible for a broadcast station to preset the second content C2. Thus, text that represents the spoken content of the second voice (i.e., subtitles) can be employed as the related information R2. The text representative of the spoken content of the second voice need not perfectly match the related information R2. It is of note that each individual broadcast station may use a different second table T2, or a second table T2 may be shared by broadcast stations.

As illustrated in FIG. 5, the controller 11 realizes functions (an information extractor 113 and an operation controller 115) by executing a program stored in the storage device 12. Some of the functions of the controller 11 may be realized by a dedicated electronic circuit. The functions of the controller 11 may be installed in a plurality of devices.

The information extractor 113 extracts the identification information D (D1 or D2) from the audio signal Y generated by the sound receiving device 14 upon receiving a playback sound that is played by the playback apparatus 50. Specifically, the information extractor 113 extracts the identification information D by performing, for example, a filtering process that emphasizes the frequency band including a sound component of the identification information D in the audio signal Y, and a demodulating process that corresponds to the modulating process performed on the identification information D. The identification information D extracted by the information extractor 113 is used to acquire related information R that corresponds to the extracted identification information D (that is, related information R about a voice of each content C output by the playback apparatus 50). The identification information D1 is used to acquire the related information R1 from the distribution apparatus 40. In contrast, the identification information D2 is used to acquire the related information R2 from the storage device 12 of the terminal apparatus 10.

The operation controller 115 acquires the related information R corresponding to the identification information D, and causes the presentation device 15 to play the acquired related information R. The operation controller 115 according to the first embodiment acquires the related information R by using different methods depending on the identification information D. When the information extractor 113 extracts the identification information D1, the terminal apparatus 10 acquires related information R1 that corresponds to the extracted identification information D1 from the distribution apparatus 40. When the information extractor 113 extracts the identification information D2, the terminal apparatus 10 acquires related information R2 that corresponds to the extracted identification information D2 from the storage device 12.

The presentation device 15 is a playback apparatus configured to present the related information R to a user. The presentation device 15 according to the first embodiment includes a display device configured to display images represented by the related information R. That is, the display device displays the related information R (R1 or R2) that relates to a voice of the content played by the playback apparatus 50.

Figure 6:
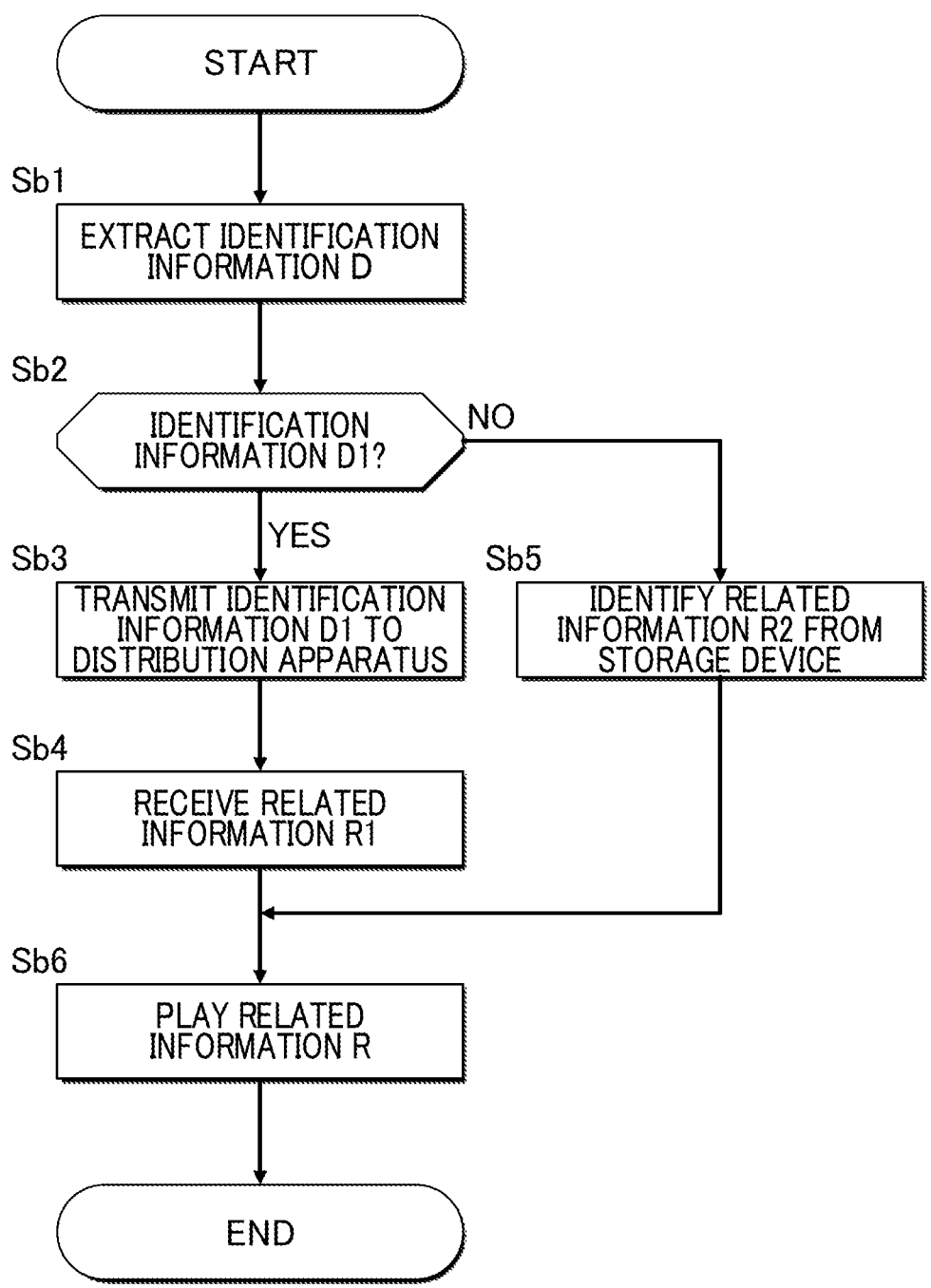
FIG. 6 is a flowchart illustrating an example of processing performed by the terminal apparatus.

FIG. 6 is a flowchart illustrating an example of processing performed by the terminal apparatus 10. For example, when the sound receiving device 14 generates the audio signal Y, the processing in FIG. 6 is initiated. When the processing in FIG. 6 is initiated, the information extractor 113 extracts the identification information D from the audio signal Y generated by the sound receiving device 14 (Sb1). The operation controller 115 determines whether the identification information D extracted by the information extractor 113 is the identification information D1 (Sb2). The operation controller 115 according to the first embodiment uses the second table T2 to determine whether the identification information D is the identification information D1. Specifically, when the identification information D extracted by the information extractor 113 does not match any of the different pieces of the identification information D2 registered in the second table T2, the operation controller 115 determines that the extracted identification information D is the identification information D1. When the identification information D extracted by the information extractor 113 matches one of a plurality of pieces of the identification information D2 registered in the second table T2, the operation controller 115 determines that the extracted identification information D is not the identification information D1 (i.e., the extracted identification information D is the identification information D2).

When the identification information D extracted by the information extractor 113 is determined to be the identification information D1 (YES at Sb2), the operation controller 115 transmits the identification information D1 to the distribution apparatus 40 (Sb3). The operation controller 115 receives related information R1 that corresponds to the identification information D1 from the distribution apparatus 40 (Sb4). The processes carried out at Steps Sb3 and Sb4 together is an operation to acquire the related information R1 corresponding to the transmitted identification information D1 by transmission of the identification information D1 to the distribution apparatus 40 (hereafter, "first acquiring operation").

In contrast, when the identification information D extracted by the information extractor 113 is determined to be the identification information D2 (NO at Sb2), the operation controller 115 identifies related information R2 that corresponds to the identification information D2 from the storage device 12. Specifically, the operation controller 115 identifies related information R2 that corresponds to the identification information D2 extracted by the information extractor 113, which is one of the plurality of pieces of the identification information D2 registered in the second table T2. The process at Step Sb5 is an operation to acquire the related information R2 corresponding to the identification information D2 from the storage device 12 of the terminal apparatus 10 (hereafter, "second acquiring operation").

As will be understood from the above descriptions, either the first acquiring operation or the second acquiring operation is selectively performed. The first acquiring operation according to the first embodiment is an operation to acquire the related information R1, which represents a recognition result W of the audio signal A1 including a first voice. The related information R1 is acquired based on the identification information D1 extracted from the audio signal Y generated by the sound receiving device 14 upon receiving a playback sound of the first voice. The second acquiring operation according to the first embodiment is an operation to acquire the related information R2, which is related to a second voice and registered in advance, based on the identification information D2 extracted from the audio signal Y, which is generated by the sound receiving device 14 upon receiving a playback sound of the second voice.

The operation controller 115 causes the presentation device 15 to play the related information R acquired by the first acquiring operation or the second acquiring operation (Sb6). That is, the presentation device 15 displays the related information R related to a voice of the content played by the playback apparatus 50.

In the first embodiment, as will be understood from the above descriptions, a sound component of the identification information D1 is included in the audio signal A1 transmitted as a result of the first broadcast operation, while a sound component of the identification information D2 is included in the audio signal A2 transmitted as a result of the second broadcast operation. Therefore, the related information R1 and the related information R2 can be provided to a user of the terminal apparatus 10 by reproducing the audio signal A. That is, a wide variety of information can be provided to a user of the terminal apparatus 10 without need for a communication device for near field communication.

The terminal apparatus 10 receives sound played by the playback apparatus 50 in the first broadcast operation and extracts the identification information D1 from the sound, so that the terminal apparatus 10 can acquire related information R1 related to a first voice via the communication network 70. Therefore, while reducing a storage capacity required in the terminal apparatus 10, it is possible for the terminal apparatus 10 to acquire a wide variety of information, such as subtitles, concurrently with broadcast of a program. In contrast, when the second broadcast operation is performed, the related information R2 related to a second voice can be acquired from the storage device 12 of the terminal apparatus 10 on the basis of the identification information D2 extracted from sound played by the playback apparatus 50. Therefore, it is possible to acquire high emergency fixed-phrase information such as emergency information without need for communication via the communication network 70. Thus, a wide variety of related information R1 can be provided while requiring less storage capacity, and at the same time, the related information R2 can be reliably provided without need for communication via the communication network 70.

In the first embodiment, the terminal apparatus 10 can acquire the identification information D2 corresponding to the related information R2 registered in advance on a second voice. It is thus possible to reliably provide the related information R2, which is indicative of the content of the second voice to, for example, hearing-impaired persons who have difficulty hearing the second voice, or foreigners who are unable to understand the content of the second voice.

According to the first embodiment, information indicative of a broadcast station of a program including a first voice is used as the identification information D1. Therefore, the first broadcast operation is simpler as compared to, for example, a configuration in which the identification information D1 differs for each individual recognition result W of the audio signal A1, or a configuration in which the identification information D1 differs for each individual first content C1. The configuration according to the first embodiment is also advantageous in that a storage capacity required in the distribution apparatus 40 can be reduced. When the second voice is a voice that announces information about an emergency, it is necessary to reliably provide the related information R2 to the terminal apparatus 10. Therefore, the configuration to acquire the related information R2 without need for communication via the communication network 70 is particularly effective in a case where the second voice is such a voice.

Second Embodiment

A second embodiment of the present disclosure is described below. In each example illustrated below, for elements having functions identical to those of the first embodiment, reference signs used in the descriptions of the first embodiment are used and detailed explanations of such elements are omitted, as appropriate.

The terminal apparatus 10 according to the second embodiment switches the acquiring operation between the first acquiring operation and the second acquiring operation based on trigger data transmitted from the broadcast system 20. The broadcast system 20 according to the second embodiment selectively performs either the first broadcast operation or the second broadcast operation in substantially the same manner as in the first embodiment. The broadcast system 20 transmits trigger data to the playback apparatus 50.

When the switcher 203 receives a switch instruction, the switcher 203 switches one of the first broadcast operation and the second broadcast operation to the other in substantially the same manner as in the first embodiment. When the switcher 203 according to the second embodiment receives a switch instruction, the switcher 203 adds trigger data to the content C (C1 and C2) broadcast by the broadcast device 205. The trigger data according to the second embodiment is a command for the terminal apparatus 10 to switch one of the first acquiring operation and the second acquiring operation to the other. Specifically, the switcher 203 adds to the audio signal A, which includes the content C, a modulated signal representative of the trigger data as a sound component. That is, the audio signal A contains a voice of the content C, a sound component of the identification information D, and a sound component of the trigger data. The broadcast device 205 transmits the broadcast data X including the audio signal A and the image signal V to the playback apparatus 50. The trigger data is not continuously added to the audio signal A, but is added to the audio signal A immediately after the switcher 203 receives the switch instruction. That is, the trigger data is added either to the content C immediately before the broadcast operation is switched, or to the content C immediately after the broadcast operation is switched.

The playback apparatus 50 according to the second embodiment plays the content C in accordance with the broadcast data X transmitted by the broadcast system 20 in substantially the same manner as in the first embodiment. In the second embodiment, sound that represents trigger data is output in addition to a voice of the content C, along with sound that represents the identification information D. Therefore, in addition to the sound component of the identification information D, a sound component of the trigger data can be included in the audio signal Y generated by the sound receiving device 14 in the terminal apparatus 10 according to the second embodiment. The information extractor 113 extracts the identification information D and the trigger data from the audio signal Y generated by the sound receiving device 14. The trigger data is extracted by use of a method that is substantially the same as that for extracting the identification information D.

The operation controller 115 determines whether trigger data is acquired. When the trigger data is acquired, the operation controller 115 switches one of the first acquiring operation and the second acquiring operation to the other. The operation controller 115 according to the second embodiment determines whether the information extractor 113 has extracted trigger data from the audio signal Y. When the information extractor 113 has extracted the trigger data, the operation controller 115 switches one of the first acquiring operation and the second acquiring operation to the other. Specifically, when the trigger data instructs the operation controller 115 to switch from the first acquiring operation to the second acquiring operation, the operation controller 115 switches the first acquiring operation to the second acquiring operation. In contrast, when the trigger data instructs the operation controller 115 to switch from the second acquiring operation to the first acquiring operation, the operation controller 115 switches the second acquiring operation to the first acquiring operation.

Figure 7:
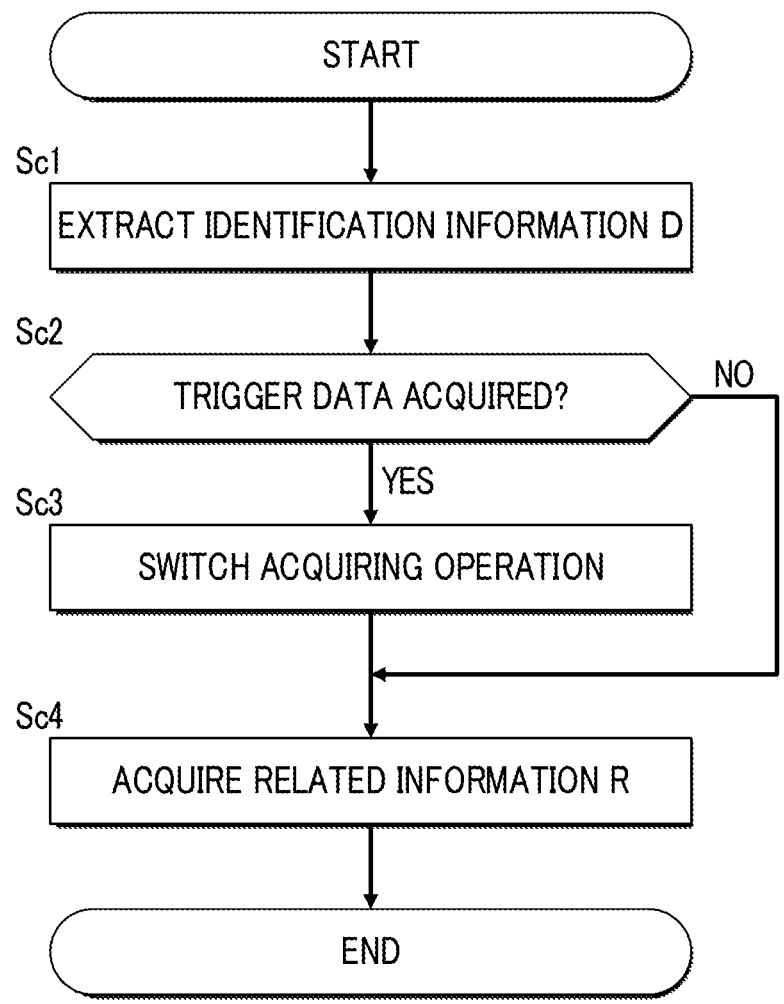
FIG. 7 is a flowchart illustrating an example of processing performed by a terminal apparatus according to a second embodiment.

FIG. 7 is a flowchart illustrating an example of processing performed by the terminal apparatus 10 according to the second embodiment. For example, when the sound receiving device 14 generates the audio signal Y, the processing in FIG. 7 is initiated. When the process in FIG. 7 is initiated, the information extractor 113 extracts the identification information D from the audio signal Y (Sc1). Since there is added trigger data in the audio signal Y immediately after the broadcast system 20 receives a switch instruction, the information extractor 113 may extract the trigger data in some cases. The operation controller 115 determines whether the trigger data is acquired (Sc2). Specifically, it is determined whether the information extractor 113 has extracted the trigger data. When the information extractor 113 has extracted the trigger data (YES at Sc2), the operation controller 115 switches one of the first acquiring operation and the second acquiring operation to the other in accordance with the trigger data (Sc3). The operation controller 115 acquires the related information R by an acquiring operation after having been switched (Sc4). In contrast, when the information extractor 113 has not extracted the trigger data (NO at Sc2), the operation controller 115 acquires the related information R without performing the process at Step Sc3 (Sc4).

In the second embodiment, substantially the same effects as those of the first embodiment are realized. In the second embodiment, the first acquiring operation and the second acquiring operation are switched from one to the other when trigger data is extracted from the audio signal Y generated upon receiving a playback sound. This makes it possible to switch the acquiring operation between the first acquiring operation and the second acquiring operation without need for discrimination between the identification information D1 and the identification information D2 (for example, the process at Sb2 in FIG. 6).

Third Embodiment

In a third embodiment there is assumed a case of occurrence of a specific event (for example, an emergency). Examples of the emergency include disaster events such as an earthquake, fire, and heavy rain. When an emergency occurs, an alarm device or an emergency vehicle (for example, an ambulance) outputs an alarm sound that informs occurrence of the emergency. When the terminal apparatus 10 according to the third embodiment detects the alarm sound, the terminal apparatus 10 switches the first acquiring operation to the second acquiring operation.

FIG. 8 is a block diagram illustrating an example of a configuration of the terminal apparatus 10 according to the third embodiment. In the configuration of the terminal apparatus 10 according to the third embodiment, a trigger data acquirer 117 is added to the terminal apparatus 10 according to the second embodiment. Upon occurrence of an emergency, the sound receiving device 14 of the terminal apparatus 10 receives sound including an alarm sound, and generates an audio signal Q that represents a waveform of the sound.

The trigger data acquirer 117 generates trigger data by analyzing the audio signal Q generated by the sound receiving device 14. The trigger data according to the third embodiment represents an occurrence of a specific event. Specifically, when the trigger data acquirer 117 determines that an alarm sound is included in the audio signal Q as a result of analyzing the audio signal Q, the trigger data acquirer 117 generates trigger data. That is, the trigger data acquirer 117 functions as an element configured to acquire trigger data. When an alarm sound is determined not to be included in the audio signal Q, trigger data is not generated.

In substantially the same manner as in the second embodiment, the operation controller 115 determines whether trigger data is acquired (Sc2). When the trigger data is acquired (YES at Sc2), the operation controller 115 switches from the first acquiring operation to the second acquiring operation. Specifically, the operation controller 115 determines whether the trigger data acquirer 117 has acquired the trigger data (Sc2). When the operation controller 115 determines that the trigger data acquirer 117 has acquired the trigger data (YES at Sc2), the operation controller 115 switches the first acquiring operation to the second acquiring operation (Sc3).

In the third embodiment, substantially the same effects as those of the second embodiment are realized. In the third embodiment, because trigger data can be acquired by, for example, receiving an alarm sound, the broadcast system 20 need not add the trigger data to the content C.

In the third embodiment, trigger data is acquired by receiving an alarm sound from an alarm device or an emergency vehicle. However, the method for acquiring trigger data is not limited to the example described above. For example, in a case where the playback apparatus 50 displays a telop together with a playback of an alarm sound (news flash sound) in a news flash informing occurrence of a specific event concurrently with playing the content C, the terminal apparatus 10 may acquire trigger data by receiving the alarm sound played by the playback apparatus 50. That is, trigger data is generated by receiving a sound informing occurrence of a specific event.

Further, the method for acquiring trigger data is not limited to receiving a sound informing the occurrence of a specific event. For example, there is assumed an alarm system that transmits alarm data representative of an occurrence of a disaster or other events to the terminal apparatus 10 (for example, push communication). The trigger data acquirer 117 acquires the alarm data transmitted from the alarm system as trigger data. When the trigger data acquirer 117 has acquired the trigger data, the operation controller 115 switches the first acquiring operation to the second acquiring operation.

Modifications

Specific modified modes additional to each of the aspects described above are set out below. A plurality of modes selected from the following descriptions may be combined with one another, as appropriate, so long as no contradiction is caused.

(1) In each embodiment described above, a television program terrestrially-broadcast or satellite-broadcast each of which using broadcast waves is illustrated as an example of the content C (C1 and C2). However, the content C is not limited to the example illustrated above. For example, the content C may be a program through IP (Internet Protocol) broadcasting that transmits broadcast data X via a mobile communication network or a communication network such as the Internet. A radio program radio-broadcast using broadcast waves or a communication network is also employed as the content C. The scope of the present disclosure is not limited to broadcast of the content C. For example, the present disclosure is also applicable to announcements for providing information on various types of facilities such as commercial facilities, where provision of such information is conducted in the facility. In the announcements in the facilities, the content C representative of a voice to provide information on the facility is broadcast by the broadcast system 20.

(2) In each embodiment described above, a television program with low emergency content is illustrated as an example of the first content C1, while a television program with high emergency content with high emergency is illustrated as an example of the second content C2. However, the first content C1 and the second content C2 are not limited to the examples illustrated above. For example, the first content C1 may consist of content that is difficult to predict due to a changing nature of the content, or may be of less importance for users. In contrast, the second content C2 may be, for example, content that is predictable and formed of fixed phrases (for example, weather forecasts), or content that is of high importance for users. For example, content that conveys information about an occurrence of an emergency would be predictable fixed phrase content that is of high importance.

Typically, although a first voice and a second voice differ from each other, they may be the same as each other. For example, the first voice and the second voice are assumed to be possibly the same as each other in a case that the first content C1 are the same as the second content C2.

(3) In each embodiment described above, the content C including the image signal V and the audio signal A is described as an example. However, the content C may or may not include the image signal V. That is, the first broadcast operation can be stated as an operation to transmit the audio signal A1 including a first voice and a sound component that represents the identification information D1, and the second broadcast operation can be stated as an operation to transmit the audio signal A2 including a second voice and a sound component that represents the identification information D2.

(4) In each embodiment described above, an information terminal of a user is utilized as the terminal apparatus 10. However, the terminal apparatus 10 is not limited to the example described above. For example, an information display terminal, such as an electronic signage (for example, a digital signage) installed in commercial facilities, may be utilized as the terminal apparatus 10.

(5) In each embodiment described above, the recognition result W for the audio signal A1 is described as an example of the related information R1. However, the related information R1 is not limited to the example illustrated above. The related information R1 may be any information so long as the information relates to a first voice. Various types of information may be described as examples of the related information R1. For example, the related information R1 may be text obtained by translating the recognition result W of the audio signal A1 into a different language; or may be information indicative of the location (URL) of commercial goods and facilities appearing in the first content C1. The text representative of a spoken content of a first voice may be acquired by a method different from voice recognition; and the text acquired by such a different method may be employed as the related information R1. For example, an operator may manually input text representative of a spoken content of a first voice, and the input text may be employed as the related information R1. That is, the voice recognition of the audio signal A1 need not necessarily be employed.

In each embodiment described above, voice recognition is performed on the audio signal A1 concurrently with broadcast of the first content C1. However, in a case of broadcasting first content C1 that has already been recorded for example, voice recognition may be performed in advance on the audio signal A1, and then the recognition result W and the identification information D1 may be stored in the distribution apparatus 40.

(6) In each embodiment described above, text representative of a spoken content of a second voice is illustrated as an example of the related information R2. However, the related information R2 is not limited to the example illustrated above. The related information R2 may be any information so long as the information relates to a second voice. Various types of information are illustrated as examples of the related information R2. For example, the related information R2 may be text obtained by translating text representative of a spoken content of a second voice into a different language; or may be graphics representative of a spoken content of a second voice.

(7) In each embodiment described above, the related information R is presented by way of display on the presentation device 15. However, the related information R may also be presented by, for example, the presentation device 15 by way of sound output, where the sound is representative of the related information R. That is, the presentation device 15 includes either one or both of a display device configured to present the related information R by displaying images, and a sound output device configured to present the related information R by outputting sound.

(8) In each embodiment described above, information indicative of a broadcast station of a program including a first voice is utilized as the identification information D1. However, the identification information D1 is not limited to the example illustrated above. For example, the identification information D1 may be information indicative of the recognition result W of the audio signal A1, or information indicative of the first content C1 (i.e., a television program broadcast by a broadcast station).

(9) In each embodiment described above, a voice that conveys information about occurrence of an emergency is illustrated as an example of the second voice. However, the second voice is not limited to the example described above. The content of the second voice is appropriately changed in accordance with the second content C2. As will be understood from the example of the second content C2 described above, in contrast to the first voice, the second voice is a voice that provides fixed-phrase content information, such as a voice that conveys information about occurrence of an emergency, or a voice that conveys weather forecast information.

(10) The broadcast system 20 according to each aspect described above selectively performs either the first broadcast operation or the second broadcast operation. However, the broadcast system 20 may perform a broadcast operation other than the first broadcast operation or the second broadcast operation. For example, the broadcast system 20 may perform a third broadcast operation to broadcast the content C to which the identification information D is not added. The broadcast system 20 selectively performs one of a plurality of broadcast operations.

(11) In each embodiment described above, the voice recognition apparatus 30 and the distribution apparatus 40 are illustrated as separate devices. However, the voice recognition apparatus 30 and the distribution apparatus 40 may be realized by a single device. The broadcast system 20 may realize either one or both of the functions of the voice recognition apparatus 30 and the distribution apparatus 40.

(12) In the first embodiment, by using the second table T2 it is determined whether the identification information D extracted by the information extractor 113 is the identification information D1 (the process at Step Sb2 in FIG. 6). However, a specific method for determining whether the identification information D is the identification information D1 is not limited to the example illustrated above. For example, the operation controller 115 may determine that the identification information D extracted by the information extractor 113 is the identification information D1 when a numerical value represented by the identification information D falls within a specific numerical range. Also, the operation controller 115 may determine that the identification information D extracted by the information extractor 113 is the identification information D2 when the numerical value falls outside the specific numerical range. The operation controller 115 may also determine whether the identification information D is the identification information D1 or the identification information D2 based on a numerical value of a specific part of a bit string represented by the identification information D. As will be understood from the above descriptions, the operation controller 115 determines whether the identification information D extracted by the information extractor 113 is the identification information D1 or the identification information D2 based on a numerical value represented by at least a part of the identification information D extracted by the information extractor 113.

(13) In each embodiment described above, the switcher 203 is illustrated as an example of an acquirer. However, the acquirer is not limited to the switcher 203. The acquirer may be comprehensively expressed as an element that acquires the broadcast data X from the first processor 201 or the second processor 202. For example, a configuration is assumed in which the switcher 203 is omitted from the broadcast system 20. In this configuration, when the first processor 201 generates the broadcast data X1, the first processor 201 outputs the generated broadcast data X1 to the broadcast device 205. When the second processor 202 generates the broadcast data X2, the second processor 202 outputs the generated broadcast data X2 to the broadcast device 205. That is, the broadcast device 205 acquires the broadcast data X directly from the first processor 201 or the second processor 202. In this configuration, an element of the broadcast device 205 that acquires the broadcast data X functions as the acquirer. That is, the broadcast device 205 may include the acquirer.

(14) The functions of the broadcast system and the terminal apparatus 10 according to each of the aspects described above are realized by cooperation of one or plural processors such as a CPU and a program as illustrated in each aspect. The program according to each aspect described above may be stored in a computer readable recording medium, and installed in a computer. The recording medium is, for example, a non-transitory recording medium. While an optical recording medium (an optical disk) such as a CD-ROM is a preferred example of the recording medium, it also includes a recording medium of any known form, such as a semiconductor recording medium or a magnetic recording medium. The non-transitory recording medium includes any recording medium except for a transitory propagating signal, and does not exclude a volatile recording medium. Further, it is also possible to provide the program to a computer via a communication network.

APPENDIX

The following configurations are derivable from the embodiments exemplified above, for example.

A broadcast system according to one aspect (a first aspect) of the present disclosure includes: an acquirer configured to acquire a first audio signal and a second audio signal and a broadcaster configured to selectively perform one of a plurality of broadcast operations including a first broadcast operation to transmit the first audio signal and a second broadcast operation to transmit the second audio signal. The first audio signal includes (i) a first voice and (ii) a sound component representative of first identification information that corresponds to first related information related to the first voice, the first related information being provided from a distribution apparatus via a communication network to a terminal apparatus, and the second audio signal includes (i) a second voice and (ii) a sound component representative of second identification information that corresponds to second related information related to the second voice, the second related information being registered in advance in the terminal apparatus. In the aspect described above, the sound component of the first identification information is included in the first audio signal transmitted by the first broadcast operation, while the sound component of the second identification information is included in the second audio signal transmitted by the second broadcast operation. Thus, the first related information and the second related information can be provided to a user of the terminal apparatus by playing the audio signals. That is, a wide variety of information can be provided to the user of the terminal apparatus without the need for a communication device for near field communication.

The terminal apparatus receives sound played by a playback apparatus in the first broadcast operation to extract the first identification information, so that the terminal apparatus can acquire the first related information related to the first voice via a communication network. Therefore, while a required storage capacity of the terminal apparatus can be reduced, the terminal apparatus can acquire a wide variety of information such as subtitles concurrently with broadcast of a program. When the second broadcast operation is executed, the second identification information is extracted from sound that is played by the playback apparatus, and the second related information related to the second voice can be acquired from a storage device of the terminal apparatus on the basis of the extracted second identification information. Therefore, it is possible to acquire high emergency fixed-phrase information such as emergency information without need for communication via the communication network. A wide variety of the first related information can be provided while the required storage capacity can be reduced. In addition, the second related information can be reliably provided without need for communication via the communication network. "A storage device of the terminal apparatus" refers to a storage device provided in a terminal apparatus, or a storage device externally connected to the terminal apparatus by wire or wirelessly.

In an example (a second aspect) of the first aspect, the first related information is text representative of a spoken content of the first voice. In the aspect described above, because text representative of a spoken content of the first voice is used as the first related information, subtitles of the first voice can be provided.

In an example (a third aspect) of either the first aspect or the second aspect, the second voice is a voice that provides fixed-phrase information. For example, the content of a second voice, such as a voice that informs about an emergency or a voice that informs about weather forecasts, is in fixed phrases. It is thus possible to define the content of the second related information in advance. Therefore, the configuration in which the second related information is stored in the storage device of the terminal apparatus is particularly effective for a case where the content of the second voice is fixed-phase information.

A terminal apparatus according to one aspect (a fourth aspect) of the present disclosure includes: an information extractor configured to extract identification information from an audio signal generated by a sound receiving device upon receiving a playback sound that is played by a playback apparatus; and an operation controller configured to selectively perform either (i) a first acquiring operation to acquire first related information that corresponds to the identification information by transmitting the identification information via a communication network to a distribution apparatus, or (ii) a second acquiring operation to acquire second related information that corresponds to the identification information from a storage device of the terminal apparatus, and the operation controller determines whether trigger data is acquired, and when the trigger data is acquired, the operation controller switches one of the first acquiring operation and the second acquiring operation to the other. In the aspect described above, related information can be acquired by extracting the identification information from the audio signal generated upon receiving a playback sound. Thus, a wide variety of information can be provided to a user of the terminal apparatus without need for a communication device for near field communication.

The first related information is acquired from the distribution apparatus via the communication network by the first acquiring operation. Therefore, while reducing the storage capacity required in the terminal apparatus, the terminal apparatus can acquire a wide variety of information such as subtitles concurrently with broadcast of a program. The second related information is acquired from the storage device of the terminal apparatus by the second acquiring operation. It is thus possible, for example, to acquire high emergency fixed-phrase information such as emergency information without need for communication via the communication network. A wide variety of the first related information can be provided while requiring less storage capacity, and at the same time, the second related information can be reliably provided without need for communication via the communication network. Further, when the trigger data is acquired, the first acquiring operation and the second acquiring operation are switched from one to the other. It is thus possible to switch the acquiring operation between the first acquiring operation and the second acquiring operation, for example, without need to discriminate between identification information used for the first acquiring operation and identification information used for the second acquiring operation.

In an example (a fifth aspect) of the fourth aspect, the information extractor extracts the trigger data from the audio signal, and the operation controller determines whether the information extractor has extracted the trigger data. In the aspect described above, the trigger data is extracted from the audio signal generated upon receiving a playback sound. Therefore, by use of a simple configuration in which the trigger data is included in the playback sound, it is possible to switch the acquiring operation between the first acquiring operation and the second acquiring operation.

In an example (a sixth aspect) of the fourth aspect, the terminal apparatus further includes a trigger data acquirer configured to acquire trigger data representative of an occurrence of a specific event, and the operation controller is configured to determine whether the trigger data acquirer has acquired the trigger data. In the aspect described above, an alarm for occurrence of a disaster, such as an earthquake or fire, can be used, as the trigger data.

A terminal apparatus according to one aspect (a seventh aspect) of the present disclosure includes: an information extractor configured to extract identification information from an audio signal generated by a sound receiving device upon receiving a playback sound that is played by a playback apparatus; and an operation controller configured to: determine whether the identification information extracted by the information extractor is first identification information or second identification information; in a case in which the extracted identification information is the first identification information, perform a first acquiring operation to acquire first related information that corresponds to the first identification information by transmitting via a communication network the first identification information to a distribution apparatus; and in a case in which the extracted identification information is the second identification information, perform a second acquiring operation to acquire second related information that corresponds to the second identification information from a storage device of the terminal apparatus. In the aspect described above, by determining whether the identification information is either the first identification information or the second identification information, one of the first acquiring operation and the second acquiring operation is performed. Therefore, it is unnecessary to transmit, to the terminal apparatus, data for switching one of the first acquiring operation and the second acquiring operation to the other, for example.

In an example (an eighth aspect) of the seventh aspect, the operation controller determines whether the identification information extracted by the information extractor is either the first identification information or the second identification information based on a numerical value represented by at least a part of the identification information extracted by the information extractor. In the aspect described above, it is determined whether the extracted identification information is the first identification information or the second identification information based on a numerical value represented by at least a part of the identification information. Thus, it is unnecessary to store the second identification information in the terminal apparatus in advance, for example.

In a preferable example (a ninth aspect) of any of the fourth to eighth aspects, the first acquiring operation is an operation to acquire first related information representative of text that represents a spoken content of a first voice that is the playback sound, and the second acquiring operation is an operation to acquire second related information on a second voice, which is the playback sound, the second related information being registered in advance. In the aspect described above, the first related information representative of text that represents a spoken content of the first voice can be acquired via the communication network, while the second related information registered in advance on the second voice can be acquired from the storage device of the terminal apparatus.

The present disclosure is also realized as a broadcasting method for a broadcast system according to each aspect described above as an example, or as a method for operating a terminal apparatus according to each aspect described above as an example.

For example, a broadcasting method for a broadcast system according to one aspect (a tenth aspect) of the present disclosure includes: acquiring a first audio signal and a second audio signal, and selectively performing one of a plurality of broadcast operations including a first broadcast operation to transmit the first audio signal and a second broadcast operation to transmit the second audio signal. The first audio signal includes (i) a first voice and (ii) a sound component that represents first identification information that corresponds to first related information related to the first voice, the first related information being provided via a communication network from a distribution apparatus to a terminal apparatus, and the second audio signal includes (i) a second voice and (ii) a sound component that represents second identification information that corresponds to second related information related to the second voice, the second related information being registered in advance in the terminal apparatus.

A method for operating a terminal apparatus according to one aspect (an eleventh aspect) of the present disclosure includes: extracting identification information from an audio signal generated by a sound receiving device upon receiving a playback sound that is played by a playback apparatus; and selectively performing either (i) a first acquiring operation to acquire first related information that corresponds to the identification information by transmitting the identification information to a distribution apparatus via a communication network, or (ii) a second acquiring operation to acquire second related information that corresponds to the identification information from a storage device in the terminal apparatus, and the selectively performing either the first acquiring operation or the second information includes determining whether trigger data is acquired, and when the trigger data is acquired, switching one of the first acquiring operation and the second acquiring operation to the other.

A method for operating a terminal apparatus according to one aspect (a twelfth aspect) of the present disclosure includes: extracting identification information from an audio signal generated by a sound receiving device upon receiving a playback sound that is played by a playback apparatus; determining whether the extracted identification information is either first identification information or second identification information; in a case in which the extracted identification information is the first identification information, performing a first acquiring operation to acquire first related information that corresponds to the first identification information by transmitting the first identification information to a distribution apparatus via a communication network; and in a case in which the extracted identification information is the second identification information, performing a second acquiring operation to acquire second related information that corresponds to the second identification information from a storage device in the terminal apparatus.

A program according to one aspect (a thirteenth aspect) of the present disclosure causes a processor in a terminal apparatus to function as: an information extractor configured to extract identification information from an audio signal generated by a sound receiving device upon receiving a playback sound that is played by a playback apparatus; and an operation controller configured to selectively perform either (i) a first acquiring operation to acquire first related information that corresponds to the identification information by transmitting the identification information to a distribution apparatus via a communication network, or (ii) a second acquiring operation to acquire second related information that corresponds to the identification information from a storage device of the terminal apparatus, and the operation controller determines whether trigger data is acquired, and when the trigger data is acquired, the operation controller switches one of the first acquiring operation and the second acquiring operation to the other.

A program according to one aspect (a fourteenth aspect) of the present disclosure causes a processor in a terminal apparatus to function as: an information extractor configured to extract identification information from an audio signal generated by a sound receiving device upon receiving a playback sound that is played by a playback apparatus; and an operation controller configured to: determine whether the identification information extracted by the information extractor is first identification information or second identification information; in a case in which the extracted identification information is the first identification information, perform a first acquiring operation to acquire first related information that corresponds to the first identification information by transmitting the first identification information to a distribution apparatus via a communication network; and in a case in which the extracted identification information is the second identification information, perform a second acquiring operation to acquire second related information that corresponds to the second identification information from a storage device of the terminal apparatus.

DESCRIPTION OF REFERENCE SIGNS

10 . . . terminal apparatus, 100 . . . information providing system, 11 . . . controller, 113 . . . information extractor, 115 . . . operation controller, 117 . . . trigger data acquirer, 12 . . . storage device, 13 . . . communication device, 14 . . . sound receiving device, 15 . . . presentation device, 20 . . . broadcast system, 201 . . . first processor, 202 . . . second processor, 203 . . . switcher, 204 . . . communication device, 205 . . . broadcast device, 30 . . . voice recognition apparatus, 40 . . . distribution apparatus, 401 . . . communication device, 403 . . . storage device, 405 . . . identifier, 50 . . . playback apparatus, 70 . . . communication network.

What is claimed is:

1. A broadcast system comprising:
at least one processor that implements instructions stored in a memory to:
acquire a first audio signal and a second audio signal, wherein:
the first audio signal includes:
a first voice;
and a first sound component representative of a piece of first identification information corresponding to a piece of first related information related to the first voice, the piece of first related information being provided from a distribution apparatus via a communication network to a terminal apparatus, and
the second audio signal includes:
a second voice;
and a second sound component representative of a piece of second identification information corresponding to a piece of second related information related to the second voice, the piece of second related information being registered in advance in a storage device of the terminal apparatus; and switch, in response to a switch instruction, from one to another among a plurality of broadcast operations, the plurality of broadcast operations including:
  a first broadcast operation that transmits the acquired first audio signal that includes both the first voice and the first sound component to a playback apparatus, which outputs the first audio signal from a speaker of the playback apparatus; and
  a second broadcast operation that transmits the acquired second audio signal that includes both the second voice and the second sound component to the playback apparatus, which outputs the second audio signal from the speaker of the playback apparatus,
wherein the at least one processor, in switching to the first or second broadcast operation, adds trigger data to the respective first or the second audio signal, which is transmitted immediately before or after the switching to the first or second broadcast operation is carried out, the trigger data being a command causing the terminal apparatus to switch from one to another among:
  a first acquiring operation to acquire the piece of first related information related to the first voice from the distribution apparatus based on the piece of first identification information; and
  a second acquiring operation to acquire the piece of second related information related to the second voice from the storage device of the terminal apparatus based on the piece of second identification information.

2. The broadcast system according to claim 1, wherein the first piece of related information is text representative of a spoken content of the first voice.

3. The broadcast system according to claim 1, wherein the second voice is a voice that provides fixed-phrase information.

4. The broadcast system according to claim 1, further comprising: the terminal apparatus, which receives the first or second audio signal.

5. A terminal apparatus comprising:
  a microphone configured to generate an audio signal from a playback sound output from a speaker of a playback apparatus, the playback sound including a first voice or a second voice;
  a storage device that includes a plurality of pieces of second identification information registered in association with respective corresponding pieces of second related information, each of the pieces of second related information being related to a corresponding one of a plurality of second voices including the second voice; and
  at least one processor that implements instructions stored in a memory to:
    extract a piece of identification information from the audio signal generated by the microphone;
    determine whether trigger data is included in the audio signal, the trigger data being a command to switch from one to another among:
      a first acquiring operation to acquire a piece of first related information related to the first voice from a distribution apparatus; and
      a second acquiring operation to acquire, from the storage device, a piece of second related information related to the second voice; and
    switch, based on the trigger data being included in the audio signal, to one to another among:
      the first acquiring operation based on the extracted piece of identification information, the first acquiring operation transmitting, via a communication network, the extracted piece of identification information to the distribution apparatus; and
      the second acquiring operation based on the extracted piece of identification information corresponding to a piece of second identification information, among the plurality of second related information; and
    perform the switched one of the first or second acquiring operation.

6. The terminal apparatus according to claim 5, wherein: the first piece of related information is representative of text that represents a spoken content of the first voice.

7. A method of operating a terminal apparatus including a storage device and a microphone that generates an audio signal from a playback sound output from a speaker of a playback apparatus, the playback sound including a first voice or a second voice, the method comprising:
  storing, in the storage device, a plurality of pieces of second identification information registered in association with respective corresponding pieces of second related information, each of the pieces of second related information being related to a corresponding one of a plurality of second voices including the second voice;
  extracting a piece of identification information from the audio signal generated by the microphone;
  determining whether trigger data is included in the audio signal, the trigger data being a command to switch from one to another among:
    a first acquiring operation to acquire a piece of first related information related to the first voice from a distribution apparatus; and
    a second acquiring operation to acquire, from the storage device, a piece of second related information related to the second voice;
  switching, based on the trigger data being included in the audio signal, to one to another among:
    the first acquiring operation based on the extracted piece of identification information, the first acquiring operation transmitting, via a communication network, the extracted piece of identification information to the distribution apparatus; and
    the second acquiring operation based on the extracted piece of identification information corresponding to a piece of second identification information, among the plurality of second related information; and
  performing the switched one of the first or second acquiring operation.

8. A non-transitory computer-readable recording medium storing a program executable by a computer to execute a method of operating a terminal apparatus including a storage device and a microphone that generates an audio signal from a playback sound output from a speaker of a playback apparatus, the playback sound including a first voice or a second voice, the method comprising:
  storing, in the storage device, a plurality of pieces of second identification information registered in association with respective corresponding pieces of second related information, each of the pieces of second related information being related to a corresponding one of a plurality of second voices including the second voice;
  extracting a piece of identification information from the audio signal generated by the microphone;
  determining whether trigger data is included in the audio signal, the trigger data being a command to switch from one to another among:

a first acquiring operation to acquire a piece of first related information related to the first voice from a distribution apparatus; and a second acquiring operation to acquire, from the storage device, a piece of second related information related to the second voice;

switching, based on the trigger data being included in the audio signal, to one to another among:

the first acquiring operation based on the extracted piece of identification information, the first acquiring operation transmitting, via a communication network, the extracted piece of identification information to the distribution apparatus; and the second acquiring operation based on the extracted piece of identification information corresponding to a piece of second identification information, among the plurality of second related information; and performing the switched one of the first or second acquiring operation.

* * * * *